United States Patent
Bidgoli et al.

(10) Patent No.: US 11,025,689 B1
(45) Date of Patent: Jun. 1, 2021

(54) MULTICAST SUPPORT

(71) Applicant: NOKIA SOLUTIONS AND NETWORKS OY, Espoo (FI)

(72) Inventors: Hooman Bidgoli, Ottawa (CA); Jayant Kotalwar, Cupertino, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/684,941

(22) Filed: Nov. 15, 2019

(51) Int. Cl.
  *H04L 12/761* (2013.01)
  *H04L 29/06* (2006.01)
  *H04L 12/931* (2013.01)

(52) U.S. Cl.
  CPC .......... *H04L 65/4076* (2013.01); *H04L 45/16* (2013.01); *H04L 49/201* (2013.01)

(58) Field of Classification Search
  None
  See application file for complete search history.

(56) References Cited

U.S. PATENT DOCUMENTS

| | | | | |
|---|---|---|---|---|
| 9,178,798 | B2 * | 11/2015 | Esale | H04L 45/22 |
| 2006/0088031 | A1 * | 4/2006 | Nalawade | H04L 12/4641 370/390 |
| 2017/0093589 | A1 * | 3/2017 | Asthana | H04L 65/4076 |
| 2017/0317841 | A1 * | 11/2017 | Xu | H04L 12/185 |
| 2019/0097944 | A1 * | 3/2019 | Kotalwar | H04L 45/16 |
| 2019/0297000 | A1 * | 9/2019 | Dutta | H04L 45/04 |
| 2020/0287732 | A1 * | 9/2020 | Bidgoli | H04L 45/52 |

OTHER PUBLICATIONS

Rosen E, Multicasting Using Bit Index Explicit Replication, Nov. 2017 (Year: 2017).*
Zhang, Z., "Bier Penultimate Hop Popping," draft-zzhang-bier-php-01, BIER, Internet-Draft, Aug. 3, 2018, 7 pages.
Zhang, Z., et al., "MVPN/EVPN Tunnel Aggregation with Common Labels," draft-zzhang-bess-mvpn-evpn-aggregarion-label-01, BESS, Internet Draft, Apr. 27, 2018.
Wijnands, et al., "Multicast Using Bit Index Explicit Replication (BIER)," IETF RFC 8279, Nov. 2017.
EP Extended Search Report mailed in corresponding EP 20207361.5 dated Mar. 17, 2021, 7 pages.

* cited by examiner

*Primary Examiner* — Cai Y Chen
(74) *Attorney, Agent, or Firm* — Tong, Rea, Bentley & Kim LLC

(57) ABSTRACT

Various example embodiments for supporting multicast in communication systems are presented. In at least some example embodiments, supporting multicast in communication systems may include supporting use of multicast domain information of a penultimate hop router of the multicast domain by an egress leaf router associated with the multicast domain for multicast service signaling to a root router of the multicast domain. In at least some example embodiments, in which the multicast domain is based on Bit Index Explicit Replication (BIER), supporting multicast in communication systems may include supporting use of BIER domain information (e.g., a BIER Forwarding Router Identifier (BFR-ID) or the like) of a PH BIER router by an egress leaf router associated with the BIER domain for multicast service signaling to a root BIER router of the BIER domain.

25 Claims, 7 Drawing Sheets

MULTICAST SUPPORT

TECHNICAL FIELD

Various example embodiments relate generally to communication systems, and more particularly but not exclusively, to supporting multicast in communication systems.

BACKGROUND

Multicast is used in many types of communication networks to deliver various types of information.

SUMMARY

In at least some example embodiments, an apparatus includes at least one processor and at least one memory including program code, wherein the at least one memory and the program code are configured to, with the at least one processor, cause the apparatus to at least send, by an egress leaf router associated with a multicast domain toward a penultimate hop router of the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the at least one memory and the program code are configured to, with the at least one processor, cause the apparatus to at least receive, by the egress leaf router from the penultimate hop router, an advertisement including the multicast domain information of the penultimate hop router of the multicast domain. In at least some example embodiments, the at least one memory and the program code are configured to, with the at least one processor, cause the apparatus to at least send, by the egress leaf router toward the penultimate hop router, multicast service signaling including the multicast domain information of the penultimate hop router of the multicast domain. In at least some example embodiments, the multicast service signaling includes at least one of Multicast Virtual Private Network (MVPN) service signaling or Ethernet Virtual Private Network (EVPN) service signaling. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router of the multicast domain. In at least some example embodiments, the indication of the request by the egress leaf router to use multicast domain information of the penultimate hop router of the multicast domain includes an invalid BIER Forwarding Router Identifier (BFR-ID) provided by the egress leaf router. In at least some example embodiments, the indication of the request by the egress leaf router to use multicast domain information of the penultimate hop router of the multicast domain includes an implicit null label or an implicit null type-length-value (TLV).

In at least some example embodiments, a non-transitory computer-readable medium includes instructions configured to cause an apparatus to at least send, by an egress leaf router associated with a multicast domain toward a penultimate hop router of the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the non-transitory computer-readable medium includes instructions configured to cause the apparatus to at least receive, by the egress leaf router from the penultimate hop router, an advertisement including the multicast domain information of the penultimate hop router of the multicast domain. In at least some example embodiments, the non-transitory computer-readable medium includes instructions configured to cause the apparatus to at least send, by the egress leaf router toward the penultimate hop router, multicast service signaling including the multicast domain information of the penultimate hop router of the multicast domain. In at least some example embodiments, the multicast service signaling includes at least one of Multicast Virtual Private Network (MVPN) service signaling or Ethernet Virtual Private Network (EVPN) service signaling. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router of the multicast domain. In at least some example embodiments, the indication of the request by the egress leaf router to use multicast domain information of the penultimate hop router of the multicast domain includes an invalid BIER Forwarding Router Identifier (BFR-ID) provided by the egress leaf router. In at least some example embodiments, the indication of the request by the egress leaf router to use multicast domain information of the penultimate hop router of the multicast domain includes an implicit null label or an implicit null type-length-value (TLV).

In at least some example embodiments, a method includes sending, by an egress leaf router associated with a multicast domain toward a penultimate hop router of the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the method includes receiving, by the egress leaf router from the penultimate hop router, an advertisement including the multicast domain information of the penultimate hop router of the multicast domain. In at least some example embodiments, the method includes sending, by the egress leaf router toward the penultimate hop router, multicast service signaling including the multicast domain information of the penultimate hop router of the multicast domain. In at least some example embodiments, the multicast service signaling includes at least one of Multicast Virtual Private Network (MVPN) service signaling or Ethernet Virtual Private Network (EVPN) service signaling. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router of the multicast domain. In at least some example embodiments, the indication of the request by the egress leaf router to use multicast domain information of the penultimate hop router of the multicast domain includes an invalid BIER Forwarding Router Identifier (BFR-ID) provided by the egress leaf router. In at least some example embodiments, the indication of the request by the egress leaf router to use multicast domain information of the penultimate hop router of the multicast domain includes an implicit null label or an implicit null type-length-value (TLV).

In at least some example embodiments, an apparatus includes means for sending, by an egress leaf router associated with a multicast domain toward a penultimate hop router of the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the apparatus includes means for receiving, by the egress leaf router from the penultimate hop router, an advertisement including the multicast domain information of the penultimate hop router of the multicast domain. In at least some example embodiments, the apparatus includes means for sending, by the egress leaf router toward the penultimate hop router, multicast service signaling including the multicast domain information of the penultimate hop router of the multicast domain. In at least some example embodiments, the multicast service signaling includes at least one of Multicast Virtual Private Network (MVPN) service signaling or Ethernet Virtual Private Network (EVPN) service signaling. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router of the multicast domain. In at least some example embodiments, the indication of the request by the egress leaf router to use multicast domain information of the penultimate hop router of the multicast domain includes an invalid BIER Forwarding Router Identifier (BFR-ID) provided by the egress leaf router. In at least some example embodiments, the indication of the request by the egress leaf router to use multicast domain information of the penultimate hop router of the multicast domain includes an implicit null label or an implicit null type-length-value (TLV).

In at least some example embodiments, an apparatus includes at least one processor and at least one memory including program code, wherein the at least one memory and the program code are configured to, with the at least one processor, cause the apparatus to at least receive, by a penultimate hop router of a multicast domain from an egress leaf router associated with the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the at least one memory and the program code are configured to, with the at least one processor, cause the apparatus to at least send, by the penultimate hop router toward the egress leaf router, an advertisement including the multicast domain information of the penultimate hop router of the multicast domain. In at least some example embodiments, the at least one memory and the program code are configured to, with the at least one processor, cause the apparatus to at least send, by the penultimate hop router within the multicast domain based on the indication of the request by the egress leaf router to use multicast domain information of the penultimate hop router of the multicast domain, an advertisement including the multicast domain information of the penultimate hop router of the multicast domain. In at least some example embodiments, the indication of the request by the egress leaf router to use multicast domain information of the penultimate hop router of the multicast domain includes an invalid node identifier provided by the egress leaf router. In at least some example embodiments, to send the advertisement including the multicast domain information of the penultimate hop router of the multicast domain, the at least one memory and the program code are configured to, with the at least one processor, cause the apparatus to at least remove, from the advertisement, the invalid node identifier provided by the egress leaf router. In at least some example embodiments, to send the advertisement including the multicast domain information of the penultimate hop router of the multicast domain, the at least one memory and the program code are configured to, with the at least one processor, cause the apparatus to at least maintain, within the advertisement, the invalid node identifier provided by the egress leaf router. In at least some example embodiments, the at least one memory and the program code are configured to, with the at least one processor, cause the apparatus to at least receive, by the penultimate hop router from the egress leaf router, multicast service signaling including the multicast domain information of the penultimate hop router of the multicast domain. In at least some example embodiments, the multicast service signaling includes at least one of Multicast Virtual Private Network (MVPN) signaling or Ethernet Virtual Private Network (EVPN) signaling. In at least some example embodiments, the at least one memory and the program code are configured to, with the at least one processor, cause the apparatus to at least receive, by the penultimate hop router via the multicast domain, a packet including a multicast packet, a multicast domain header, and a multicast domain label, wherein the multicast packet includes a multicast payload and an upstream assigned label associated with the egress leaf router, remove, by the penultimate hop router from the packet the multicast domain label and the multicast domain header, to recover thereby the multicast packet, and forward, by the penultimate hop router toward the egress leaf router, the multicast packet. In at least some example embodiments, to forward the multicast packet, the at least one memory and the program code are configured to, with the at least one processor, cause the apparatus to at least send, by the penultimate hop router, the multicast packet over each interface of the penultimate hop router on which the penultimate hop router received a route related to the multicast domain. In at least some example embodiments, to forward the multicast packet, the at least one memory and the program code are configured to, with the at least one processor, cause the apparatus to at least determine, by the penultimate hop router, based on a mapping of the upstream assigned label for the egress leaf router to a multicast domain prefix for the egress leaf router, an interface of the penultimate hop router that is connected to the egress leaf router and send, by the penultimate hop router via the interface of the penultimate hop router that is connected to the egress leaf router, the multicast packet. In at least some example embodiments, the at least one memory and the program code are configured to, with the at least one processor, cause the apparatus to at least determine the mapping of the upstream assigned label for the egress leaf router to the multicast domain prefix for the egress leaf router based on routes advertised by a routing information protocol. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router. In at least some example embodiments, the indication of the request by the egress leaf router to use multicast domain information of the penultimate hop router of the multicast domain comprises an invalid BIER Forwarding Router Identifier (BFR-ID). In at least some example embodiments, the indication of the request by the egress leaf router to use multicast domain information of the penultimate hop router of the multicast domain includes an implicit null label or an implicit null type-length-value (TLV).

In at least some example embodiments, a non-transitory computer-readable medium includes instructions configured to cause an apparatus to at least receive, by a penultimate hop router of a multicast domain from an egress leaf router associated with the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the non-transitory computer-readable medium includes instructions configured to cause the apparatus to at least send, by the penultimate hop router toward the egress leaf router, an advertisement including the multicast domain information of the penultimate hop router of the multicast domain. In at least some example embodiments, the non-transitory computer-readable medium includes instructions configured to cause the apparatus to at least send, by the penultimate hop router within the multicast domain based on the indication of the request by the egress leaf router to use multicast domain information of the penultimate hop router of the multicast domain, an advertisement including the multicast domain information of the penultimate hop router of the multicast domain. In at least some example embodiments, the indication of the request by the egress leaf router to use multicast domain information of the penultimate hop router of the multicast domain includes an invalid node identifier provided by the egress leaf router. In at least some example embodiments, to send the advertisement including the multicast domain information of the penultimate hop router of the multicast domain, the non-transitory computer-readable medium includes instructions configured to cause the apparatus to at least remove, from the advertisement, the invalid node identifier provided by the egress leaf router. In at least some example embodiments, to send the advertisement including the multicast domain information of the penultimate hop router of the multicast domain, the non-transitory computer-readable medium includes instructions configured to cause the apparatus to at least maintain, within the advertisement, the invalid node identifier provided by the egress leaf router. In at least some example embodiments, the non-transitory computer-readable medium includes instructions configured to cause the apparatus to at least receive, by the penultimate hop router from the egress leaf router, multicast service signaling including the multicast domain information of the penultimate hop router of the multicast domain. In at least some example embodiments, the multicast service signaling includes at least one of Multicast Virtual Private Network (MVPN) signaling or Ethernet Virtual Private Network (EVPN) signaling. In at least some example embodiments, the non-transitory computer-readable medium includes instructions configured to cause the apparatus to at least receive, by the penultimate hop router via the multicast domain, a packet including a multicast packet, a multicast domain header, and a multicast domain label, wherein the multicast packet includes a multicast payload and an upstream assigned label associated with the egress leaf router, remove, by the penultimate hop router from the packet the multicast domain label and the multicast domain header, to recover thereby the multicast packet, and forward, by the penultimate hop router toward the egress leaf router, the multicast packet. In at least some example embodiments, to forward the multicast packet, the non-transitory computer-readable medium includes instructions configured to cause the apparatus to at least send, by the penultimate hop router, the multicast packet over each interface of the penultimate hop router on which the penultimate hop router received a route related to the multicast domain. In at least some example embodiments, to forward the multicast packet, the non-transitory computer-readable medium includes instructions configured to cause the apparatus to at least determine, by the penultimate hop router, based on a mapping of the upstream assigned label for the egress leaf router to a multicast domain prefix for the egress leaf router, an interface of the penultimate hop router that is connected to the egress leaf router and send, by the penultimate hop router via the interface of the penultimate hop router that is connected to the egress leaf router, the multicast packet. In at least some example embodiments, the non-transitory computer-readable medium includes instructions configured to cause the apparatus to at least determine the mapping of the upstream assigned label for the egress leaf router to the multicast domain prefix for the egress leaf router based on routes advertised by a routing information protocol. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router. In at least some example embodiments, the indication of the request by the egress leaf router to use multicast domain information of the penultimate hop router of the multicast domain comprises an invalid BIER Forwarding Router Identifier (BFR-ID). In at least some example embodiments, the indication of the request by the egress leaf router to use multicast domain information of the penultimate hop router of the multicast domain includes an implicit null label or an implicit null type-length-value (TLV).

In at least some example embodiments, a method includes receiving, by a penultimate hop router of a multicast domain from an egress leaf router associated with the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the method includes sending, by the penultimate hop router toward the egress leaf router, an advertisement including the multicast domain information of the penultimate hop router of the multicast domain. In at least some example embodiments, the method includes sending, by the penultimate hop router within the multicast domain based on the indication of the request by the egress leaf router to use multicast domain information of the penultimate hop router of the multicast domain, an advertisement including the multicast domain information of the penultimate hop router of the multicast domain. In at least some example embodiments, the indication of the request by the egress leaf router to use multicast domain information of the penultimate hop router of the multicast domain includes an invalid node identifier provided by the egress leaf router. In at least some example embodiments, sending the advertisement including the multicast domain information of the penultimate hop router of the multicast domain includes removing, from the advertisement, the invalid node identifier provided by the egress leaf router. In at least some example embodiments, sending the advertisement including the multicast domain information of the penultimate hop router of the multicast domain includes maintaining, within the advertisement, the invalid node identifier provided by the egress leaf router. In at least some example embodiments, the method includes receiving, by the penultimate hop router from the egress leaf router, multicast service signaling including the multicast domain information of the penultimate hop router of the multicast domain. In at least some example embodiments, the multicast service signaling includes at least one of Multicast Virtual Private Network (MVPN) signaling or Ethernet Virtual Private Network (EVPN) signaling. In at least some example embodiments, the method includes receiving, by the penultimate hop router via the multicast domain, a packet including a multicast packet, a multicast domain header, and a multicast domain label, wherein the multicast packet includes a multicast payload and an upstream assigned label associated with the egress leaf router, removing, by the penultimate hop router from the packet the multicast domain label and the multicast domain header, to recover thereby the multicast packet, and forwarding, by the penultimate hop router toward the egress leaf router, the multicast packet. In at least some example embodiments, forwarding the multicast packet includes sending, by the penultimate hop router, the multicast packet over each interface of the penultimate hop router on which the penultimate hop router received a route related to the multicast domain. In at least some example embodiments, forwarding the multicast packet includes determining, by the penultimate hop router, based on a mapping of the upstream assigned label for the egress leaf router to a multicast domain prefix for the egress leaf router, an interface of the penultimate hop router that is connected to the egress leaf router and sending, by the penultimate hop router via the interface of the penultimate hop router that is connected to the egress leaf router, the multicast packet. In at least some example embodiments, the method includes determining the mapping of the upstream assigned label for the egress leaf router to the multicast domain prefix for the egress leaf router based on routes advertised by a routing information protocol. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router. In at least some example embodiments, the indication of the request by the egress leaf router to use multicast domain information of the penultimate hop router of the multicast domain comprises an invalid BIER Forwarding Router Identifier (BFR-ID). In at least some example embodiments, the indication of the request by the egress leaf router to use multicast domain information of the penultimate hop router of the multicast domain includes an implicit null label or an implicit null type-length-value (TLV).

In at least some example embodiments, an apparatus includes means for receiving, by a penultimate hop router of a multicast domain from an egress leaf router associated with the multicast domain, an indication of a request by the egress leaf router to use multicast domain information of the penultimate hop router of the multicast domain. In at least some example embodiments, the multicast domain information of the penultimate hop router includes an identifier of the penultimate hop router within the multicast domain. In at least some example embodiments, the indication of the request by the egress leaf router to use multicast domain information of the penultimate hop router of the multicast domain includes a request by the egress leaf router for the penultimate hop router to use penultimate hop popping. In at least some example embodiments, the indication of the request by the egress leaf router to use multicast domain information of the penultimate hop router of the multicast domain includes an invalid node identifier provided by the egress leaf router. In at least some example embodiments, the apparatus includes means for sending, by the penultimate hop router toward the egress leaf router, an advertisement including the multicast domain information of the penultimate hop router of the multicast domain. In at least some example embodiments, the apparatus includes means for sending, by the penultimate hop router within the multicast domain based on the indication of the request by the egress leaf router to use multicast domain information of the penultimate hop router of the multicast domain, an advertisement including the multicast domain information of the penultimate hop router of the multicast domain. In at least some example embodiments, the indication of the request by the egress leaf router to use multicast domain information of the penultimate hop router of the multicast domain includes an invalid node identifier provided by the egress leaf router. In at least some example embodiments, the means for sending the advertisement including the multicast domain information of the penultimate hop router of the multicast domain includes means for removing, from the advertisement, the invalid node identifier provided by the egress leaf router. In at least some example embodiments, the means for sending the advertisement including the multicast domain information of the penultimate hop router of the multicast domain includes means for maintaining, within the advertisement, the invalid node identifier provided by the egress leaf router. In at least some example embodiments, the apparatus includes means for receiving, by the penultimate hop router from the egress leaf router, multicast service signaling including the multicast domain information of the penultimate hop router of the multicast domain. In at least some example embodiments, the multicast service signaling includes at least one of Multicast Virtual Private Network (MVPN) signaling or Ethernet Virtual Private Network (EVPN) signaling. In at least some example embodiments, the apparatus includes means for receiving, by the penultimate hop router via the multicast domain, a packet including a multicast packet, a multicast domain header, and a multicast domain label, wherein the multicast packet includes a multicast payload and an upstream assigned label associated with the egress leaf router, means for removing, by the penultimate hop router from the packet the multicast domain label and the multicast domain header, to recover thereby the multicast packet, and means for forwarding, by the penultimate hop router toward the egress leaf router, the multicast packet. In at least some example embodiments, the means for forwarding the multicast packet includes means for sending, by the penultimate hop router, the multicast packet over each interface of the penultimate hop router on which the penultimate hop router received a route related to the multicast domain. In at least some example embodiments, the means for forwarding the multicast packet includes means for determining, by the penultimate hop router, based on a mapping of the upstream assigned label for the egress leaf router to a multicast domain prefix for the egress leaf router, an interface of the penultimate hop router that is connected to the egress leaf router and means for sending, by the penultimate hop router via the interface of the penultimate hop router that is connected to the egress leaf router, the multicast packet. In at least some example embodiments, the apparatus includes means for determining the mapping of the upstream assigned label for the egress leaf router to the multicast domain prefix for the egress leaf router based on routes advertised by a routing information protocol. In at least some example embodiments, the multicast domain is a Bit Index Explicit Replication (BIER) domain, wherein the multicast domain information of the penultimate hop router of the multicast domain includes a BIER Forwarding Router Identifier (BFR-ID) of the penultimate hop router. In at least some example embodiments, the indication of the request by the egress leaf router to use multicast domain information of the penultimate hop router of the multicast domain comprises an invalid BIER Forwarding Router Identifier (BFR-ID). In at least some example embodiments, the indication of the request by the egress leaf router to use multicast domain information of the penultimate hop router of the multicast domain includes an implicit null label or an implicit null type-length-value (TLV).

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting multicast in communication systems are presented. Various example embodiments for supporting multicast in communication systems are presented within the context of a communication system that is using Bit Index Explicit Replication (BIER) and BIER penultimate hop (PH) popping (PHP) to support multicast; however, it will be appreciated that various example embodiments for supporting multicast in communication systems may be used within the various other communication systems which may use various other multicast techniques to support multicast. In at least some example embodiments, supporting multicast in communication systems may include supporting use of multicast domain information of a PH router of the multicast domain by an egress leaf router associated with the multicast domain for multicast service signaling to a root router of the multicast domain. In at least some example embodiments, the egress leaf router associated with the multicast domain may use the multicast domain identification information of the PH router of the multicast domain (e.g., an identifier of the PH router within the multicast domain) as its own identification information (e.g., as opposed to using its own identifier) for multicast service signaling to the root router of the multicast domain. In at least some example embodiments, in which the multicast domain is based on BIER, supporting multicast in communication systems may include supporting use of BIER domain information (e.g., a BIER Forwarding Router Identifier (BFR-ID) or the like) of a PH BIER router by an egress leaf router associated with the BIER domain for multicast service signaling to a root BIER router of the BIER domain. It will be appreciated that at least some such example embodiments may obviate a need for assignment of a BFR-ID to an egress leaf router that is not part of the BIER datapath given that the PH BIER router removes the BIER header from packets before forwarding packets to the egress leaf router and, further, that obviating the need to assign a unique BFR-ID to the egress leaf router also may provide various advantages given that the BIER header usually can support only a limited number of bits (e.g., currently, most implementations support a 256-bit Bit String Length (BSL) in the BIER header). It will be appreciated that these and various other example embodiments and advantages or potential advantages of supporting multicast in communication systems (including within communication systems in which multicast is supported using BIER) may be further understood by way of reference to the various figures, which are discussed further below.

Figure 1:
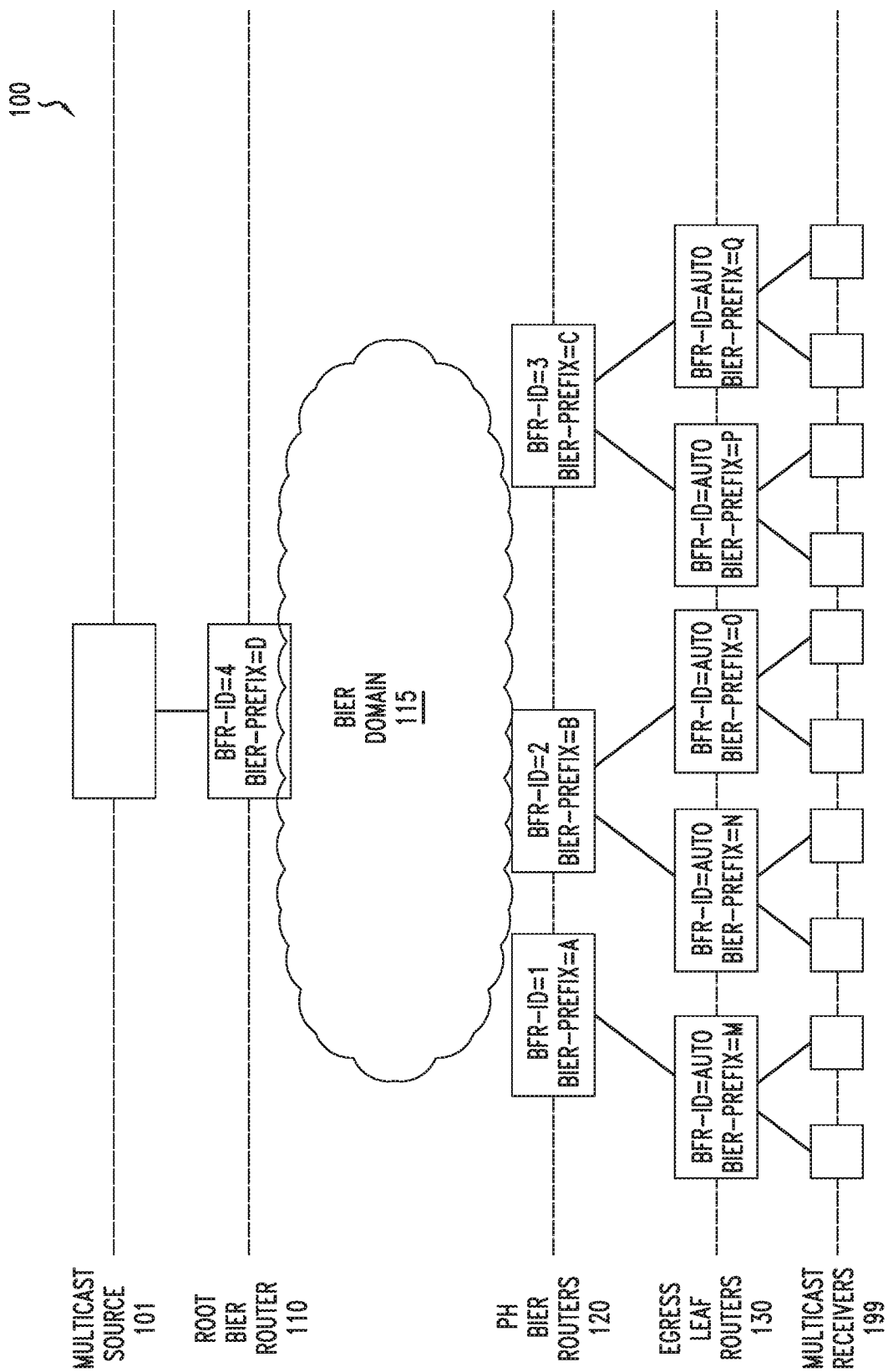
FIG. 1 depicts an example embodiment of a communication system configured to support multicasting of information from a multicast source to a set of multicast receivers via a BIER domain.

FIG. 1 depicts an example embodiment of a communication system configured to support multicasting of information from a multicast source to a set of multicast receivers via a BIER domain.

The communication system 100 supports multicasting of content from a multicast source 101 to a set of multicast receivers 199. The communication system 100 supports multicasting of content from the multicast source 101 to the multicast receivers 199 using multicast techniques. For example, the multicast source 101 may be a content server or other suitable source of content which may be multicast to the multicast receivers 199. For example, the multicast receivers 199 may include end devices (e.g., end user devices, network devices, or the like) which are the consumers of the multicast content (e.g., smartphones, tablets, laptops, televisions, or the like), devices supporting end devices which are the consumers of the multicast content (e.g., customer edge routers, gateways, or the like), or the like, as well as various combinations thereof. For example, the multicast content may include multimedia content, video content, audio content, software (e.g., software releases, updated, patches, or the like), or any other types of content which may be distributed using multicast techniques.

The communication system 100 supports multicasting of multicast content from the multicast source 101 to the multicast receivers 199 using a hierarchy of multicast routers based on BIER. The hierarchy of multicast routers based on BIER supports a BIER domain 115. The multicast routers include a root BIER router 110, a set of penultimate hop (PH) BIER routers 120, and a set of egress leaf routers 130. The root BIER router 110 is configured as a Bit-Forwarding Ingress Router (BFIR) of the BIER domain 115. The PH BIER routers 120 may be configured to perform penultimate hop popping (PHP) for the BIER domain 115, in which case the PH BIER routers 120 will operate as the Bit-Forwarding Egress Routers (BFERs) of the BIER domain 115. The set of egress leaf routers 130 may include BIER capable routers and BIER incapable routers. The root BIER router 110 and the PH BIER routers 120 are part of the BIER domain 115 (and, optionally, although not depicted, at least a portion of the egress leaf routers 130 also may be considered to be part of the BIER domain 115 under certain circumstances). For example, BIER may be supported based on RFC 8279.

The communication system 100, as indicated above, supports multicasting of multicast content from the multicast source 101 to the multicast receivers 199 based on use of BIER within the BIER domain 115. BIER utilizes BIER packets to transport multicast packets (e.g., an upstream assigned label and a multicast payload in the form of a customer multicast packet being sent from the multicast source 101 to the multicast receivers 199 of the multicast group) via the BIER domain 115. BIER utilizes a BIER packet, including a BIER header and a BIER payload that includes the multicast packet, to transport the multicast packet via the BIER domain 115. BIER utilizes a bit string (referred to as the BIER BitString) in the BIER header to identify egress leaf routers from which the multicast packets being transported in the BIER payloads are to exit the BIER domain 115 (referred to as BFERs), where each bit position in the bit string corresponds to a different one of the egress leaf routers (i.e., each bit of the bit string provides a unique BFR-ID for the egress leaf router with which it is associated). This provides a limitation on the number of BFERs which may be supported for the multicast domain within a single Set Identifier (SI), since the number of bit positions which may be supported in a single SI in the BIER header is limited. It will be appreciated that BIER may be hardware dependent (e.g., it is possible that not every type of hardware is capable of supporting the BIER datapath) such that, as noted above, the egress leaf routers 130 serving the multicast receivers 199 may include a combination of BIER capable routers (e.g., routers capable of supporting the BIER datapath) and BIER incapable routers (e.g., routers incapable of supporting the BIER datapath).

The communication system 100, as indicated above, also supports use of BIER PHP, which has been introduced to allow BIER incapable routers to utilize the BIER domain 115 to operate as egress leaf routers 130 for various virtual private network (VPN) services (e.g., Multicast Virtual Private Network (MVPN) services, Ethernet Virtual Private Network (EVPN) services, or the like). In BIER PHP, the PH BIER router 120 receives a BIER packet including a BIER header and a BIER payload that includes a multicast packet (e.g., an upstream assigned label and a multicast payload in the form of a customer multicast packet being sent from the multicast source 101 to the multicast receivers 199 of the multicast group), removes the BIER header from the BIER packet to recover the multicast packet being transported as the BIER payload (e.g., the upstream assigned label and the multicast payload in the form of a customer multicast packet being sent from the multicast source 101 to the multicast receivers 199 of the multicast group), and forwards the multicast packet (e.g., the upstream assigned label and the multicast payload in the form of a customer multicast packet being sent from the multicast source 101 to the multicast receivers 199 of the multicast group) recovered from the BIER packet toward the egress leaf router(s) 130 with the upstream assigned label as the outermost label. For example, for MVPN/EVPN services, the upstream assigned label may be a Border Gateway Protocol (BGP) upstream assigned label (e.g., a Multiprotocol—BGP (MP-BGP) upstream assigned label, such as an MP-BGP upstream assigned label that is based on the https://tools.ietf.org/html/draft-zzhang-bess-mvpn-evpn-aggregation-label-01 document) or other suitable specific label. For example, BIER PHP may be supported based on the https://tools.ietf.org/html/draft-zzhang-bier-php-101 document. It is noted that, while the BIER incapable routers do not operate within the BIER datapath (e.g., since the BIER header is removed by the PH BIER routers), the https://tools.ietf.org/html/draft-zzhang-bier-php-101 document for BIER PHP indicates that BIER signaling be started on the BIER incapable routers such that the BIER incapable routers are configured with BIER signaling and BFR-IDs.

The communication system 100 is configured to support use of BIER information of a PH BIER router 120 by an egress leaf router 130 supported by the PH BIER router 120, thereby obviating a need for the assignment of unique BIER information to the egress leaf router 130 in addition to the PH BIER router 120. For example, the BIER information of the PH BIER router 120 which may be used by egress leaf router 130 may be the BFR-ID of the PH BIER router. It will be appreciated that this may provide various advantages, because it obviates a need for assignment of a BFR-ID to a router that is not part of the BIER datapath (namely, the egress leaf router 130) given that the PH BIER router 120 terminates BIER packets by removing the BIER headers from the BIER packets before forwarding the multicast packets (e.g., customer multicast packets and associated upstream assigned labels) being transport in the BIER payloads of the BIER packets to the egress leaf routers 130. Additionally, it will be appreciated that obviating the need to assign a unique BFR-ID to the egress leaf router 130 also may provide various advantages given that the BFR-ID typically is a limitation in the BIER datapath (e.g., a limitation on the number of BFERs which may be supported in a given multicast domain within a certain SI). In other words, use of the BFR-ID of the PH BIER router 120 by an egress leaf router 130 supported by the PH BIER router 120, rather than using its own unique assigned BFR-ID, essentially enables the PH BIER router 120 to become the BFER in place of the egress leaf router 130. As discussed further, the use of BIER information of the PH BIER router 120 by an egress leaf router 130 supported by the PH BIER router 120 may be used by egress leaf routers 130 that are BIER incapable routers and/or BIER capable routers.

The communication system 100 is configured to support multicast in a manner configured to enable a PH BIER router 120 that is supporting an egress leaf router 130 to operate as a BFER in place of the egress leaf router 130 while also enabling the egress leaf router 130 to use the BFR-ID of the PH BIER router 120, thereby obviating a need for assignment of a BFR-ID to the egress leaf router 130 since the egress leaf router 130 is not part of the BIER datapath given that the PH BIER router 120 supporting the egress leaf router 130 removes the BIER headers from the BIER packets before forwarding the multicast packets (e.g., customer multicast packets and associated upstream assigned labels) being transport in the BIER payloads of the BIER packets to the egress leaf router 130. This enables the egress leaf router 130 to use the BFR-ID of the PH BIER router 120 supporting the egress leaf router 130 in its multicast service signaling to the root BIER router 110 such that the root BIER router 110 will build the BIER header to the PH BIER router 120 supporting the egress leaf router 130, rather than to the egress leaf router 130, such that PHP may be used at the PH BIER router 120. It will be appreciated that the multicast service signaling from the egress leaf router 130 to the root BIER router 110 may be based on a Border Gateway Protocol (BGP), such as MP-BGP, or other suitable multicast service signaling protocols. This provides much needed savings in the BIER header (Bit String) given that the BFR-IDs of the leaf routers are removed and only the BFR-IDs of the PH routers (which now are the new EBBRs) are advertised via the MP-BGP signaling (e.g., in the example in FIG. 1, the actual bits being used on the BIER header if the egress leaf routers 130 advertise their own BIER-ID was 5 bits as compared to 3 bits now that the egress leaf routers 130 use the BFR-IDs of their connected PH BIER routers 120).

The egress leaf router 130 sends, to the PH BIER router 120, an indication of a request by the egress leaf router 130 to use the BFR-ID of the PH BIER router 120. The indication of the request by the egress leaf router 130 to use the BFR-ID of the PH BIER router 120 also may be considered to be an indication of a request by the egress leaf router 120 for the upstream BIER router to become a PH BIER router for the egress leaf router. The indication of the request by the egress leaf router 130 to use the BFR-ID of the PH BIER router 120 also may be considered to be an indication of a request by the egress leaf router 130 for the upstream BIER router, when it becomes a PH BIER router for the egress leaf router, to also become a BFER (e.g., having its own BFR-ID and advertising itself to the BIER domain 115 as a BFER with its own BFR-ID) for the egress leaf router 130. The egress leaf router 130 may send the indication of the request by the egress leaf router 130 to use the BFR-ID of the PH BIER router 120 by advertising implicit null functionality to the PH BIER router 120. The egress leaf router 130 may advertise implicit null functionality to the PH BIER router 120 using an implicit null label (e.g., using a label 3 value), an implicit null TLV (e.g., a TLV as described in the https://tools.ietf.org/html/draft-zzhang-bier-php-01 document), or the like, as well as various combinations thereof. The egress leaf router 130 may send the indication of the request by the egress leaf router 130 to use the BFR-ID of the PH BIER router 120 by advertising implicit null functionality to the PH BIER router 120 while setting the BFR-ID to an "Invalid BFR-ID" so as to indicate to the PH BIER router 120 that the egress leaf router will use the BFR-ID of the PH BIER router 120 and also that the egress leaf router 130 is configured to obtain its BFR-ID from the PH BIER router 120 automatically. It will be appreciated that other types of indications may be used by the egress leaf router 130 to indicate the request by the egress leaf router 130 to use the BFR-ID of the PH BIER router 120 (e.g., a new TLV or other suitable indicator). The advertising of implicit null functionality to the PH BIER router 120 by the egress leaf router 130 informs the PH BIER router 120 that it is to use PHP for popping the BIER headers from the BIER packets before forwarding the multicast packets (e.g., customer multicast packets and associated upstream assigned labels) being transport in the BIER payloads of the BIER packets to the egress leaf router 130. The PH BIER router 120 receives, from the egress leaf router 130, the indication of the request by the egress leaf router 130 to use the BFR-ID of the PH BIER router 120. An example of such a process is depicted in FIG. 2.

Figure 2:
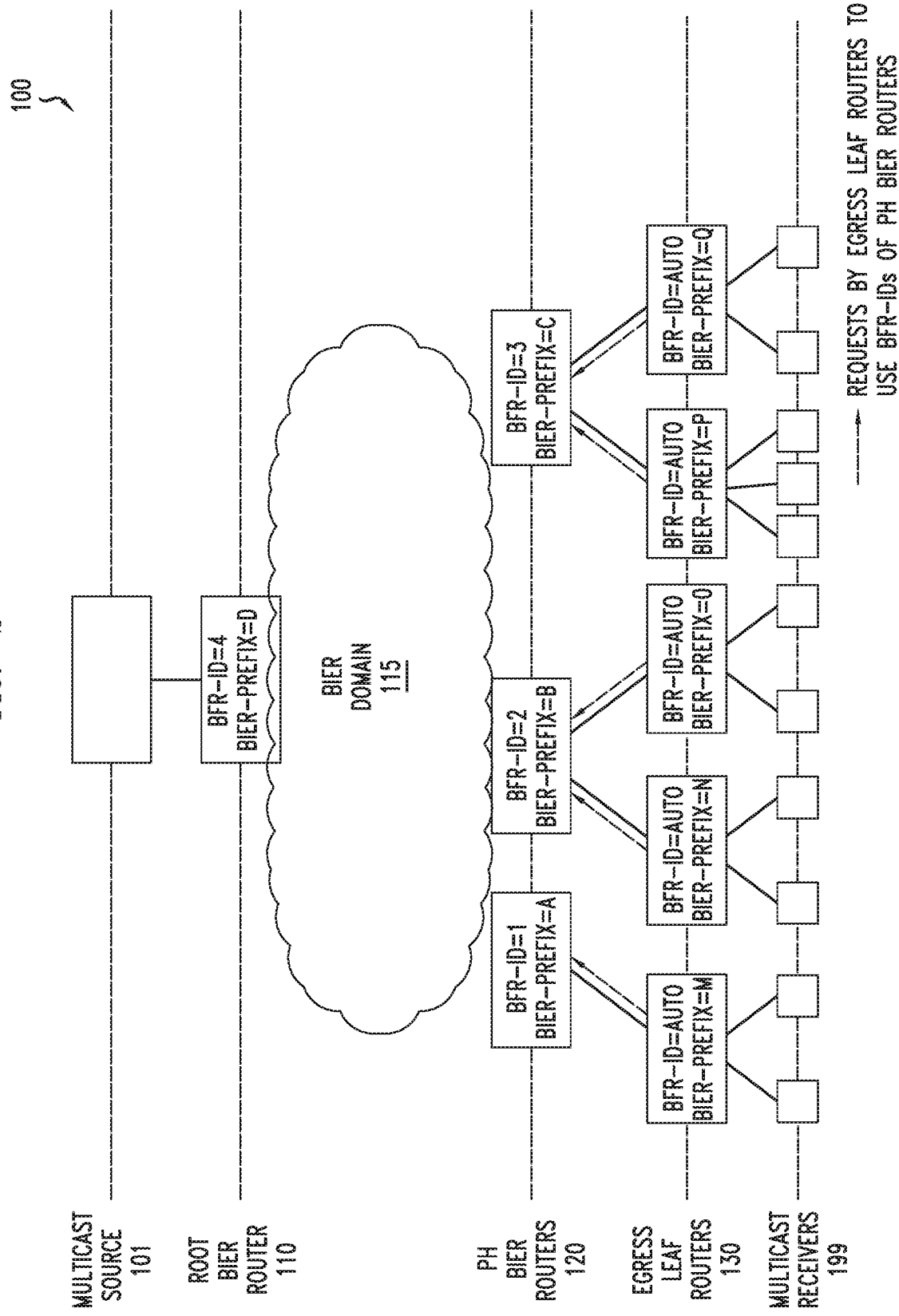
FIG. 2 depicts the communication system of FIG. 1, for illustrating a request by an egress leaf router to use information of a PH BIER router.

FIG. 2 depicts the communication system of FIG. 1, for illustrating a request by an egress leaf router 130 to use information of a PH BIER router 120. In general, FIG. 2 illustrates requests from each of the egress leaf routers 130 to the connected PH BIER routers 120 requesting use of the BFR-IDs of the connected PH BIER routers 120. More specifically, FIG. 2 illustrates that the egress leaf router with BIER-Prefix=M sends a request to use BFR-ID=1 of the connected PH BIER router 120, the egress leaf routers with BIER-Prefix=N and BIER-Prefix=O send requests to use BFR-ID=2 of the connected PH BIER router 120, and the egress leaf routers with BIER-Prefix=P and BIER-Prefix=Q send requests to use BFR-ID=3 of the connected PH BIER router 120.

The PH BIER router 120, based on the indication of the request by the egress leaf router 130 to use the BFR-ID of the PH BIER router 120, performs a number of actions. The indication of the request by the egress leaf router 130 to use the BFR-ID of the PH BIER router 120 causes the PH BIER router 120 to configure itself to use PHP for popping the BIER headers from BIER packets before forwarding the multicast packets (e.g., customer multicast packets and associated upstream assigned labels) being transport in the BIER payloads of the BIER packets to the egress leaf router 130. The indication of the request by the egress leaf router 130 to use the BFR-ID of the PH BIER router 120 causes the PH BIER router 120 to configure itself to operate as a BFER for the egress leaf router 130 (e.g., such that the PH BIER router 120 is configured to have its own BFR-ID and to advertise itself to the BIER domain 115 as a BFER with its own BFR-ID). The indication of the request by the egress leaf router 130 to use the BFR-ID of the PH BIER router 120 also causes the PH BIER router 120 to provide its BFR-ID to the egress leaf router 130 for use in its multicast signaling to the root BIER router 110.

The PH BIER router 120 may provide its BFR-ID to the BIER domain 115 and to the egress leaf router 130 that requested to use the BFR-ID of the PH BIER router based on flooding of its BFR-ID. The PH BIER router 120 may flood its BFR-ID to the BIER domain 115, including to the egress leaf router 130 that requested to use the BFR-ID of the PH BIER router 120, using BIER signaling. The PH BIER router 120 may flood its BFR-ID to the BIER domain 115, including to the egress leaf router 130 that requested to use the BFR-ID of the PH BIER router 120, using BIER signaling via a BIER sub-TLV that includes the BFR-ID of the PH BIER router 120. The PH BIER router 120 may flood its BFR-ID to the BIER domain 115, including to the egress leaf router 130 that requested to use the BFR-ID of the PH BIER router 120, using BIER signaling via a routing information protocol (e.g., an IGP, a BGP, or the like) configured for advertising routes. The PH BIER router 120 may flood its BFR-ID to the BIER domain 115, including to the egress leaf router 130 that requested to use the BFR-ID of the PH BIER router 120, using BIER signaling via a routing information protocol in various ways. An example of such a process is depicted in FIG. 3.

Figure 3:
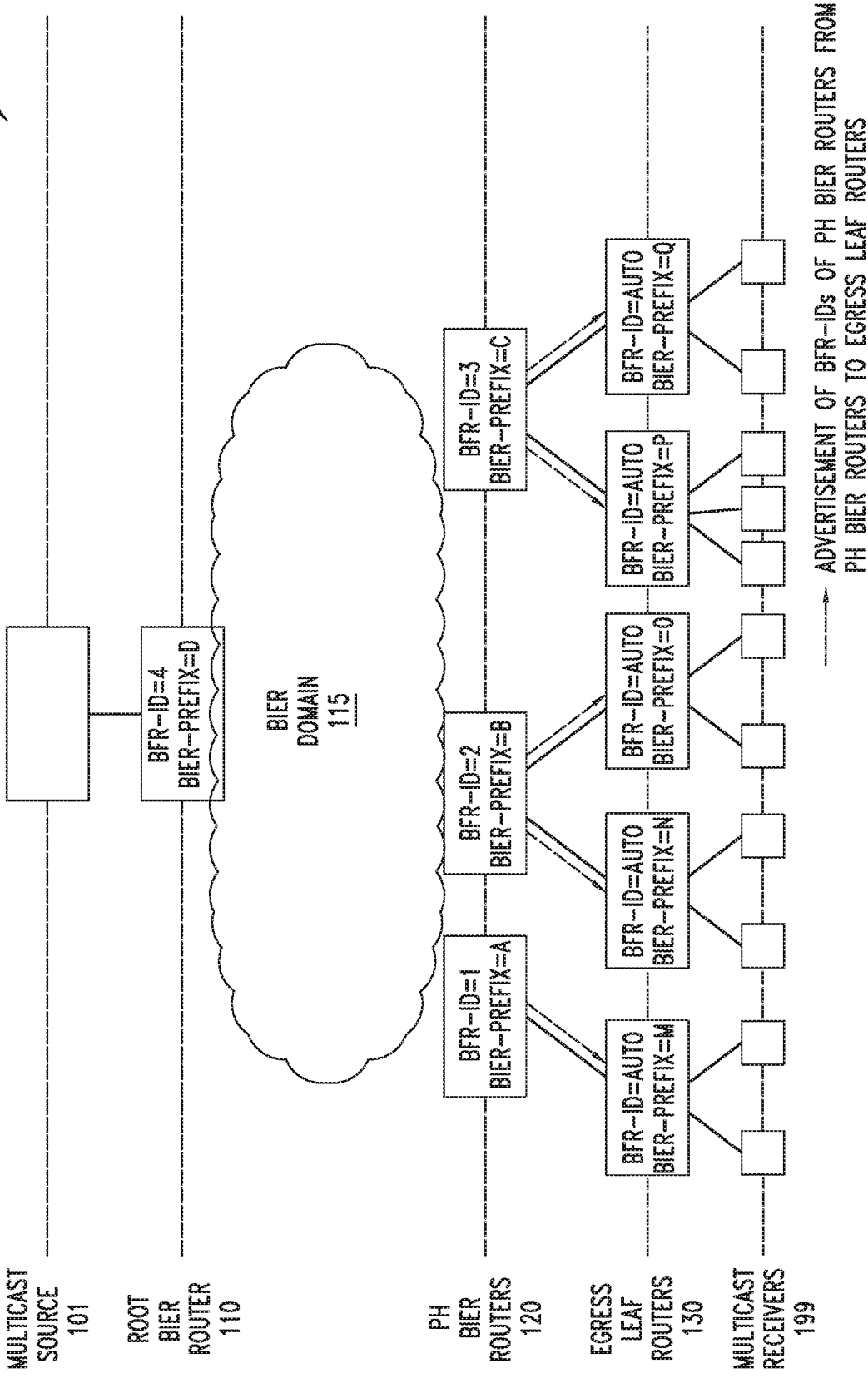
FIG. 3 depicts the communication system of FIG. 1, for illustrating flooding of information of a PH BIER router from the PH BIER router to the BIER domain and to the egress leaf router requesting to use information of the PH BIER router.

FIG. 3 depicts the communication system of FIG. 1, for illustrating flooding of information of a PH BIER router 120 from the PH BIER router 120 to the BIER domain 115 and to the egress leaf router 130 requesting to use information of the PH BIER router 120. In general, FIG. 3 illustrates advertisements from the PH BIER routers 120 to the connected egress leaf routers 130 responsive to the requests from each of the egress leaf routers 130 to the connected PH BIER routers 120 requesting use of the BFR-IDs of the connected PH BIER routers 120. More specifically, FIG. 3 illustrates that the PH BIER router 120 with BFR-ID=1 advertises BFR-ID=1 to the egress leaf router with BIER-Prefix=M, the PH BIER router 120 with BFR-ID=2 advertises BFR-ID=2 to the egress leaf routers with BIER-Prefix=N and BIER-Prefix=O, and the PH BIER router 120 with BFR-ID=3 advertises BFR-ID=3 to the egress leaf routers with BIER-Prefix=P and BIER-Prefix=Q.

The PH BIER router 120 may flood its BFR-ID to the BIER domain 115, including to the egress leaf router 130 that requested to use the BFR-ID of the PH BIER router 120, using BIER signaling in a manner for indicating to the BIER domain 115 that the egress leaf router 130 has the same BFR-ID as the PH BIER router 120.

The PH BIER router 120 may flood its BFR-ID to the BIER domain 115, including to the egress leaf router 130 that requested to use the BFR-ID of the PH BIER router 120, using BIER signaling without indicating to the BIER domain 115 that the egress leaf router 130 is using the BFR-ID of the PH BIER router 120. The PH BIER router 120 may flood its BFR-ID to the BIER domain 115 without indicating to the BIER domain 115 that the egress leaf router 130 is using the BFR-ID of the PH BIER router 120 by removing the BIER INFO TLV of the egress leaf router 130 (e.g., the BIER INFO TLV of the egress leaf router 130 received by the PH BIER router 120 from the egress leaf router 130) from the route that is advertised by the PH BIER router 120. It will be appreciated that, in this case, the egress leaf router 130 is removed from the BIER datapath.

The PH BIER router 120 may flood its BFR-ID to the BIER domain 115, including to the egress leaf router 130 that requested to use the BFR-ID of the PH BIER router 120, using BIER signaling without indicating to the BIER domain 115 that the egress leaf router 130 is using the BFR-ID of the PH BIER router 120. The PH BIER router 120 may flood its BFR-ID to the BIER domain 115 without indicating to the BIER domain 115 that the egress leaf router 130 is using the BFR-ID of the PH BIER router 120 by leaving the BFR-ID in the BIER INFO TLV received from the egress leaf router (e.g., the "Invalid BFR-ID" provided in the BIER INFO TLV of the egress leaf router) unchanged in the route that is advertised by the PH BIER router 120.

It will be appreciated that the PH BIER router 120 may flood its BFR-ID to the BIER domain 115, including to the egress leaf router 130 that requested to use the BFR-ID of the PH BIER router 120, using BIER signaling via a routing information protocol in various other ways.

The egress leaf router 130 receives the BFR-ID of the PH BIER router 120 from the PH BIER router 120, sets the BFR-ID of the PH BIER router 120 as its own BFR-ID, and uses the BFR-ID of the PH BIER router 120 for multicast service signaling (e.g., MVPN, EVPN, or the like) for establishing multicast service. The egress leaf router 130, as indicated above, may receive the BFR-ID of the PH BIER router 120 from the PH BIER router 120 using BIER signaling (e.g., a BIER sub-TLV) via a routing information protocol (e.g., an IGP, a BGP, or the like) configured for advertising routes.

The egress leaf router 130 sends multicast service signaling, using the BFR-ID of the PH BIER router 120, toward the root BIER router 110 for establishing multicast service. The egress leaf router 130 sends the multicast service signaling to the connected PH BIER router 120. The PH BIER router 120 receives the multicast service signaling from the egress leaf router 130 and forwards the multicast service signaling from the egress leaf router 130 toward the root BIER router 110 such that the root BIER router 110 learns the BFR-ID of the PH BIER router 120 from the multicast service signaling of the egress leaf router 130. The root BIER router 110 receives the multicast service signaling, including the BFR-ID of the PH BIER router 120. As discussed herein, the multicast service signaling may be based on BGP, such as MP-BGP (e.g., based on the https://tools.ietf.org/html/draft-ietf-bier-mvpn-11 document), or using any other suitable multicast service signaling protocol. The multicast service signaling may include MVPN service signaling or EVPN service signaling for establishing MVPN service or EVPN service, respectively (or may include other suitable types of multicast service signaling). The multicast service signaling may be sent in various ways which may depend on the type of multicast service signaling. For example, in the case of MVPN service signaling or EVPN service signaling for establishing MVPN service or EVPN service, respectively, the egress leaf router 130 may use the BFR-ID of the PH BIER router 120 in the BFR-ID Field of the Tunnel Attribute (PTA) of the x-PMSI (Provider Service Multicast Interface) A-D route (e.g., as discussed in the https://tools.ietf.org/html/draft-ietf-bier-mvpn-11 document). An example of such a process is depicted in FIG. 4.

Figure 4:
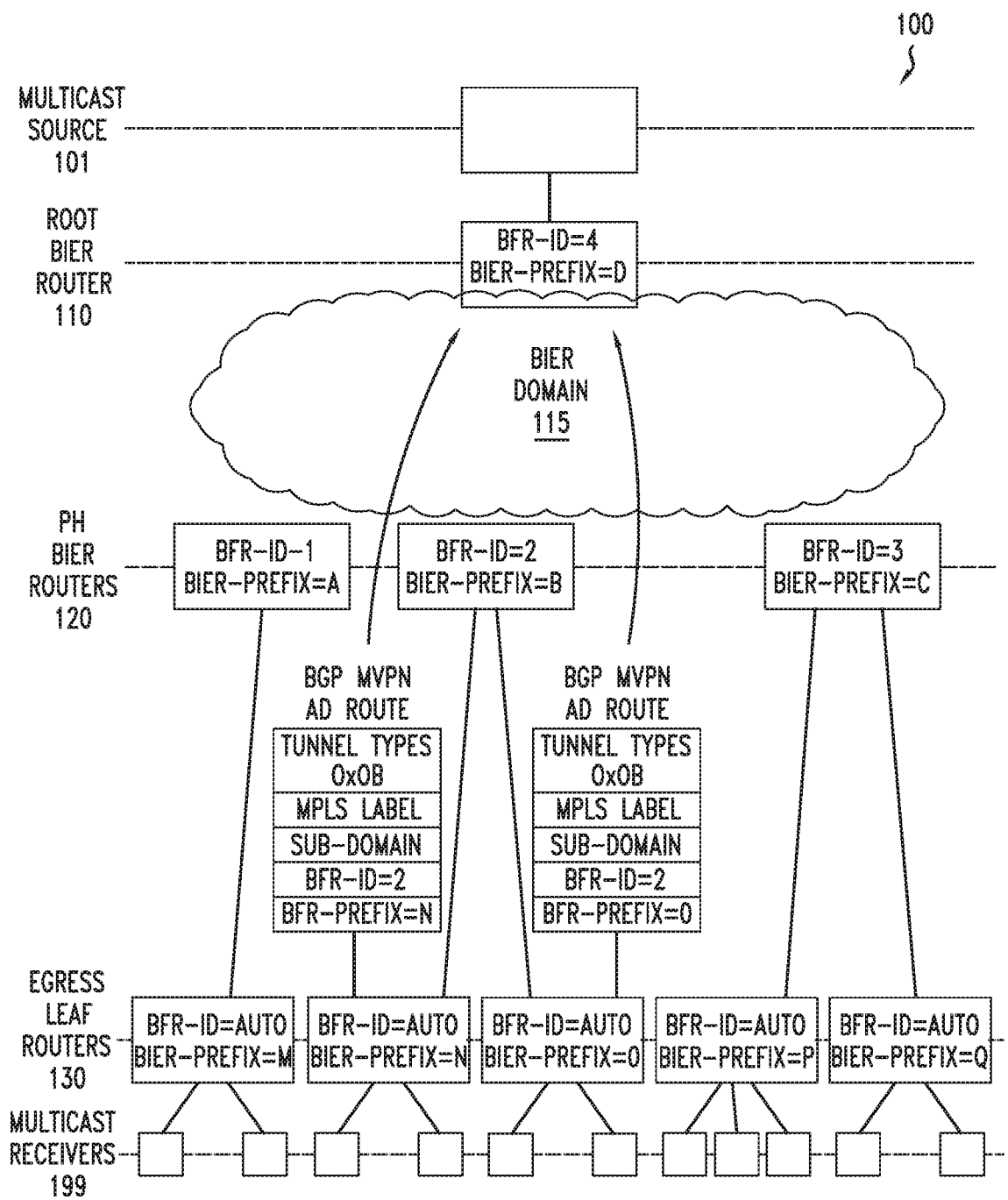
FIG. 4 depicts the communication system of FIG. 1, for illustrating use of information of a PH BIER router by an egress leaf router for multicast service signaling.

FIG. 4 depicts the communication system of FIG. 1, for illustrating use of information of a PH BIER router 120 (e.g., the BFR-ID of the PH BIER router 120) by an egress leaf router 130 for multicast service signaling. In general, FIG. 4 illustrates MVPN service signaling from two of the egress leaf routers 130 (illustrative, the egress leaf routers 130 with BIER-Prefix IDs "N" and "O") to their connect PH BIER router 120 (illustratively, the PH BIER router 120 having a BFR-ID of "2") using BGP MVPN AD Route BIER PTAs. More specifically, FIG. 4 illustrates MVPN service signaling using BGP MVPN AD Route BIER PTAs having the following fields: Tunnel type (=0x0B), MPLS Label, Sub-Domain, BFR-ID (=PH 2 BFR-ID=2), and BFR-Prefix. It will be appreciated that fewer or more, as well as different, fields may be included within a BGP MVPN AD Route BIER PTA. It will be appreciated that other route types or data structures may be used for multicast service signaling (e.g., for MVPN service, for other types of service such as EVPN or the like, and so forth).

The root BIER router 110 receives the multicast service signaling of the egress leaf router 130, learns the BFR-ID of the PH BIER router 120 from the multicast service signaling of the egress leaf router 130, and uses the BFR-ID of the PH BIER router 120 for building the BIER packets that are used to transport multicast packets (including the multicast payloads of the multicast source 101 and associated upstream assigned labels) to the egress leaf router 130 for delivery to multicast receivers 199. The root BIER router 110 uses the BFR-ID of the PH BIER router 120 for building the BIER packets, that are used to transport multicast packets (including the multicast payloads of the multicast source 101 and associated upstream assigned labels) to the egress leaf router 130 for delivery to multicast receivers 199, by building the BIER header for the BIER packets to the PH BIER router 120 rather than to the egress leaf router 130 that initiated the multicast service signaling (since the BFR-ID of the PH BIER router 120, rather than a unique BFR-ID of the egress leaf router 130, is included in the multicast service signaling from the egress leaf router 130). The root BIER router 110 uses the BFR-ID of the PH BIER router 120, for building the BIER packets that are used to transport multicast packets (including the multicast payloads of the multicast source 101 and associated upstream assigned labels) to the egress leaf router 130 for delivery to multicast receivers 199, by using the BFR-ID of the PH BIER router 120 to mark the appropriate bit in the BIER-Index of the BIER headers of BIER packets that are used to transport multicast packets (including the multicast payloads of the multicast source 101 and associated upstream assigned labels) to the egress leaf router 130 for delivery to multicast receivers 199 (namely, to mark the bit in the BIER-Index such that it identifies the PH BIER router 120 as the BFER for the BIER packets).

Figure 5:
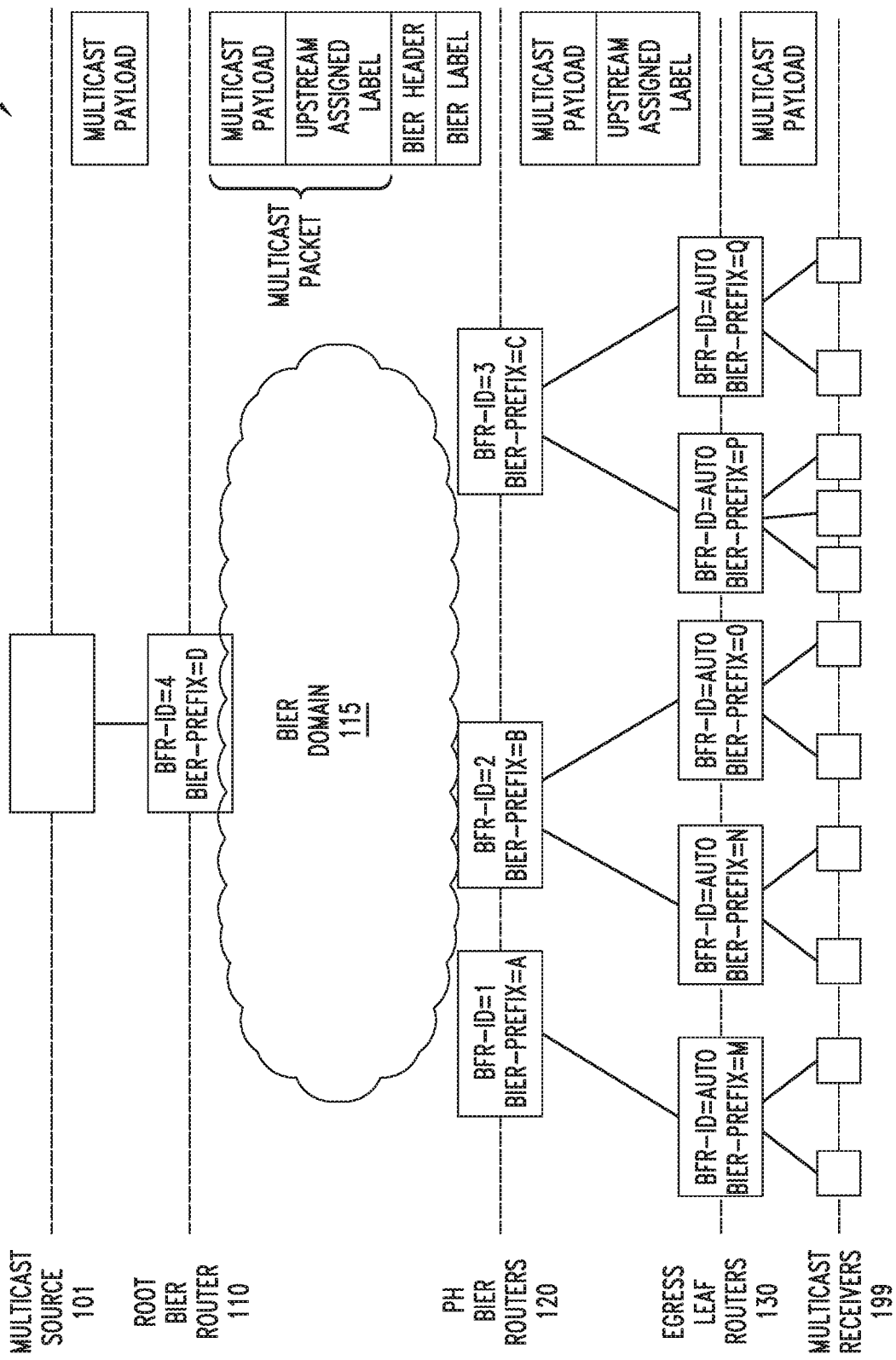
FIG. 5 depicts the communication system of FIG. 1, for illustrating multicasting of content from the multicast source to multicast receivers based on use of PHP at the PH BIER router.

The root BIER router 110 sends the BIER packets, which are used to transport multicast packets (including the multicast payloads of the multicast source 101 and associated upstream assigned labels) to the egress leaf router 130 for delivery to multicast receivers 199, via the BIER domain 115. The BIER packets are routed through the BIER domain 115 based on the BIER header of the BIER packets until reaching the PH BIER router 120 associated with the egress leaf router 130. The PH BIER router 120 removes the BIER headers from the BIER packets based on PHP (since the BIER headers of the BIER packets are marked with the BFR-ID of the PH BIER router 120) to recover the multicast packets from the BIER payloads of the BIER packets and forwards the multicast packets (including the multicast payloads of the multicast source 101 and associated upstream assigned labels) such that the multicast packets reach the egress leaf router 130 and, thus, such that the multicast receivers 199 of the multicast group connected to the egress leaf router 130 receive the multicast payloads of the multicast packets (i.e., the original multicast payloads of the multicast source 101). The PH BIER router 120 may forward the multicast packets recovered from the BIER packets, such that the multicast packets reach the egress leaf router 130, in a number of ways as discussed further below. The egress leaf router 130 receives the multicast packets (including the multicast payloads of the multicast source 101 and associated upstream assigned labels) from the PH BIER router 120, removes the upstream assigned labels from the multicast packets to recover the multicast payloads, and forwards the multicast payloads (i.e., the original payload of the multicast source, which may be customer multicast packets) toward associated multicast receivers 199 supported by the egress leaf router 130 based on the upstream assigned labels of the multicast packets. An example of such a process is depicted in FIG. 5.

The PH BIER router 120, as indicated above, may forward the multicast packets, such that the multicast packets reach the egress leaf router 130, in a number of ways. However, it is noted that, since the PH BIER router 120 is not part of the BGP signaling, the PH BIER router 120 will not have an understanding of the upstream assigned label of the egress leaf router 130, which may impact the manner in which the PH BIER router determines forwarding of multicast packets toward the egress leaf router 130. For example, the PH BIER router 120 with BFR-ID=B does not know which upstream assigned label was assigned to the egress leaf router 130 with BIER-Prefix=N and which upstream assigned label was assigned to the egress leaf router 130 with BIER-Prefix=O and, similarly, the PH BIER router 120 with BFR-ID=C does not know which upstream assigned label was assigned to the egress leaf router 130 with BIER-Prefix=P and which upstream assigned label was assigned to the egress leaf router 130 with BIER-Prefix=Q. As a result, the PH BIER router 120 may perform forwarding of the multicast packets recovered from the BIER packets, such that the multicast recovered from the BIER packets reach the egress leaf router 130, in a number of ways.

In at least some example embodiments, in which the PH BIER router 120 does not attempt to learn upstream assigned label information for the egress leaf router 130, the PH BIER router 120 will broadcast the multicast packets on all interfaces on which the PH BIER router 120 received a route with the BIER TLV. This may cause the multicast packets to be sent to other egress leaf routers, in addition to the egress leaf router 130 for which the multicast packets are intended, however, the other egress leaf routers that do not need the multicast packets but which receive the multicast packets anyway may simply drop the multicast packets (e.g., based on a determination that the upstream assigned label attached to the multicast payload in the multicast packets does not match its own upstream assigned label).

In at least some example embodiments, in which the PH BIER router 120 does attempt to learn upstream assigned label information for the egress router 130, the PH BIER router 120 will determine, based on the learned information, the interface to which the egress leaf router 130 is connected and send the multicast packets on the interface to which the egress leaf router 130 is connected. The upstream assigned label information that is learned for the egress leaf router 130 may include a mapping of the upstream assigned label for the egress leaf router 130 to a BIER prefix for the egress leaf router 130. The PH BIER router 120 may learn the upstream assigned label information for the egress leaf router 130 by listening to the routes advertised by the routing information protocol (e.g., BGP routes of BGP) and, upon receiving a route for the egress leaf router 130 (or any other egress leaf router for which it is operating as a PH BIER router), noting the upstream assigned label for the egress leaf router 130 and the associated BIER prefix for the egress leaf router 130 such that the PH BIER router 120 may create and store the mapping of the upstream assigned label for the egress leaf router 130 to a BIER prefix for the egress leaf router 130. For example, in the case of BGP, the PH BIER router 120 can be part of the BGP domain and listen to all BGP routes and, upon receiving a BGP AD route for the egress leaf router 130 for which it is acting as a PH router for, noting the upstream assigned unique label for the egress leaf router 130 and the BIER prefix for the egress leaf router 130 such that the PH BIER router 130 may now use the BIER prefix of the BGP AD route PTA to determine the interface of the PH BIER router 120 via which the PH BIER router 120 is connected to the egress leaf router 130 and then configure the datapath to forward the multicast packets with that specific upstream assigned label out of that interface.

It will be appreciated that, although primarily described with respect to sending of the BIER packets which are used to transport multicast payloads of the multicast source 101 to a single egress leaf router 130 of a single PH BIER router 120, the BIER packets which are used to transport multicast payloads of the multicast source 101 may be sent to any suitable number of egress leaf routers 130 of any suitable number of PH BIER routers 120 depending on the set of multicast receivers 199 that belong to the associated multicast group.

FIG. 5 depicts the communication system of FIG. 1, for illustrating multicasting of content from the multicast source 101 to multicast receivers 199 based on use of PHP at the PH BIER routers 120. As depicted in FIG. 5, a multicast payload from the multicast source 101 is multicasted to the multicast receivers 199 that are part of the multicast group. The multicast source 101 provides the multicast payload to the root BIER router 110 (e.g., where the multicast payload may be a customer multicast packet that is configured to transport content from the multicast source 101 to the multicast receivers 199 that are part of the multicast group, such as an IP packet, an MPLS packet, or the like). The root BIER router 110 receives the multicast payload from the multicast source 101, adds the upstream assigned label to the multicast payload to form a multicast packet, and generates a BIER packet including the multicast packet (including the multicast payload and the upstream assigned label), based on addition of a BIER header and a BIER label, for supporting multicasting of the multicast packet (again, including the multicast payload and the upstream assigned label) to each of the PH BIER routers 120 supporting egress leaf routers 130 that are serving multicast receivers 199 that are part of the multicast group. The PH BIER routers 120 that receive the BIER packet including the multicast packet (again, including the multicast payload and the upstream assigned label) remove the BIER label and the BIER header and forward the multicast packet (again, including the multicast payload and the upstream assigned label) to egress leaf routers 130 that are serving multicast receivers 199 that are part of the multicast group (e.g., by sending the multicast packet over each interface of the PH BIER router 120 on which the PH BIER router 120 received a route with the BIER TLV, by sending the multicast packet over each interface of the PH BIER router 120 that is determined by the PH BIER router 120 from a mapping of the upstream assigned label for the respective egress leaf router 130 that is included within the multicast packet to a BIER prefix for the respective egress leaf router 130, or the like). The egress routers 130 that receive the multicast packet (again, including the multicast payload and the upstream assigned label) remove the upstream assigned label from the multicast packet to recover the multicast payload and use the upstream assigned label to forward the recovered multicast payload to connected multicast receivers 199 that are part of the multicast group.

It will be appreciated that, in at least some embodiments, if an egress leaf router 130 does not advertise implicit null functionality or is not configured to obtain its BFR-ID automatically, the egress leaf router 130 may not use the BFR-ID of the PH BIER router 120 and, thus, may utilize its own BFR-ID rather than using the BFR-ID of the PH BIER router 120.

It will be appreciated that, although primarily presented herein with respect to various example embodiments in which multicast is based on BIER, various example embodiments presented herein also may be used or adapted for use in networks in which multicast is based on various other types of multicast mechanisms.

Figure 6:
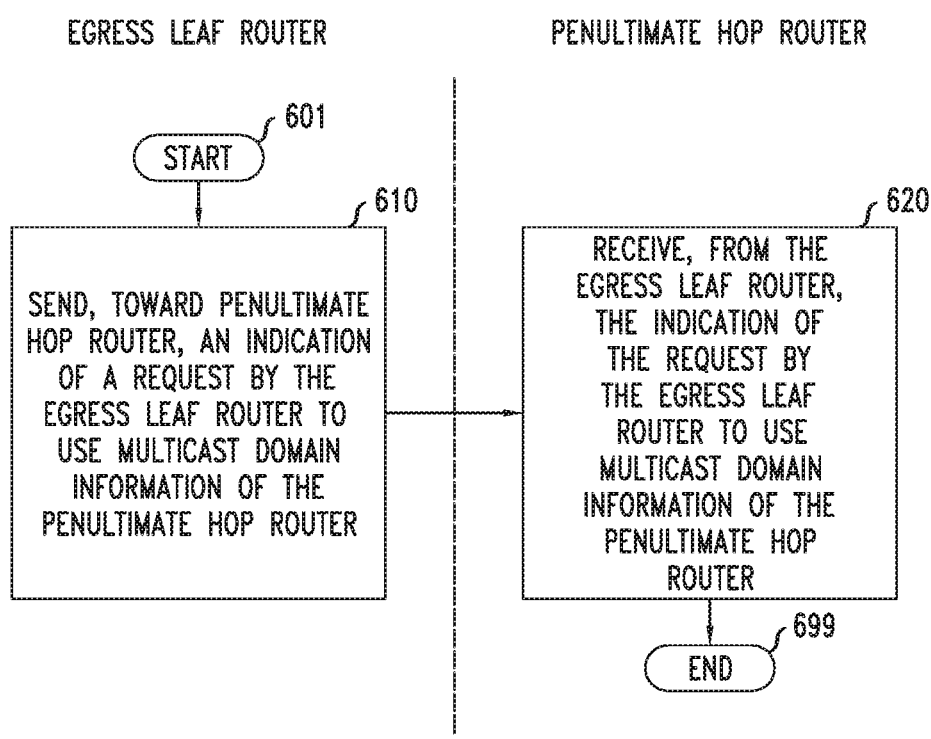
FIG. 6 depicts an example embodiment of a method for supporting multicasting of information from a multicast source to a set of multicast receivers via a multicast domain based on use by an egress leaf router of multicast domain information of a penultimate hop router of the multicast domain.

FIG. 6 depicts an example embodiment of a method for supporting multicasting of information from a multicast source to a set of multicast receivers via a multicast domain based on use by an egress leaf router of multicast domain information of a penultimate hop router of the multicast domain. It will be appreciated that, although primarily presented as being performed serially, at least a portion of the functions of method 600 may be performed contemporaneously or in a different order than as presented with respect to FIG. 6. At block 601, method 600 begins. At block 610, an egress leaf router associated with the multicast domain sends, toward a penultimate hop router of the multicast domain, an indication of a request by the egress leaf router to use multicast domain information of the penultimate hop router of the multicast domain. At block 620, the penultimate hop router of the multicast domain receives, from the egress leaf router associated with the multicast domain, the indication of the request by the egress leaf router to use multicast domain information of the penultimate hop router of the multicast domain. At block 699, method 600 ends. It will be appreciated that various multicast support functions presented herein with respect to FIGS. 1-5 may be incorporated within the context of method 600 of FIG. 6.

Various example embodiments for supporting multicast in a communication system may provide various advantages or potential advantages. For example, various example embodiments for supporting multicast may support movement of the BFER role to routers higher in the BIER hierarchy (e.g., closer to the root BIER router), thereby increasing the number of egress leaf routers which may be supported given a finite number of BFR-IDs available for use within a BIER domain and an SI. For example, various example embodiments for supporting multicast may obviate a need for assignment of BFR-IDs to routers that are not part of the BIER datapath (namely, egress leaf routers) given that the PH BIER routers remove the BIER header from packets before forwarding the packets to the egress leaf routers. For example, various example embodiments for supporting multicast, by obviating the need to assign unique BFR-IDs to egress leaf routers, also may provide various advantages given that the BFR-ID typically is a limitation in the BIER datapath, e.g., a limitation on the number of BFERs which may be supported in a given multicast domain and an SI (e.g., most vendors support only a certain BSI BIER set index within a SI (e.g., 256)), such as by providing savings to the number of bits that are used in the BSI within a given SI by setting the PH router BFR-ID in the BIER header and omitting the egress leaf router BFR-ID from the BIER header (since they are replaced by the PH router). For example, various example embodiments for supporting multicast may support use of the BFR-IDs of PF routers by BIER capable egress leaf routers, in addition to BIER incapable egress leaf routers, for supporting additional savings in the BIER BIT Index space and BFR-IDs based on use of PHP procedures. For example, various example embodiments for supporting multicast may enable a significantly larger number of egress leaf nodes to be supported without requiring use of BIER packet duplication with SIs. For example, if BIER supports only 256 bits in the BIER header, the BIER domain would otherwise be limited to use of only 256 leaf PE routers; however, by operating upstream PH BIER routers as BFERs and having the egress leaf routers utilize the BFR-IDs of the PH BIER routers, significantly more than 256 leaf PE routers may be supported even though BIER may only support 256 bits in the BIER header. Various example embodiments for supporting multicast in a communication system may provide various other advantages or potential advantages.

Figure 7:
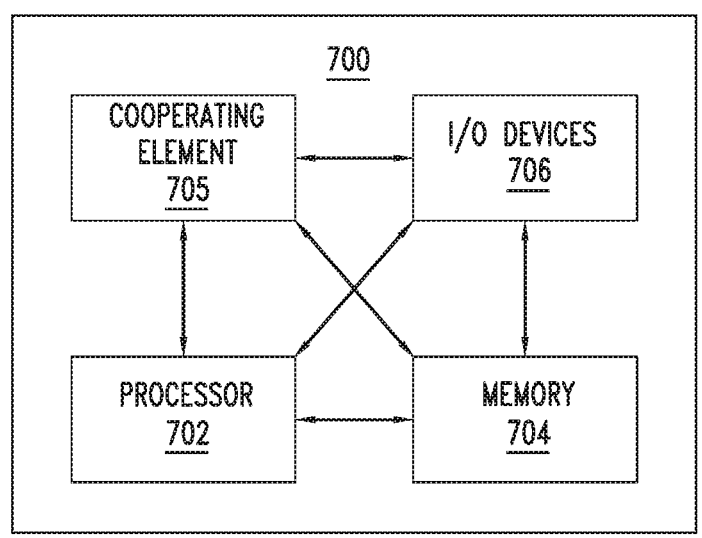
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit, a processor, a processor having a set of processor cores, a processor core of a processor, or the like) and a memory 704 (e.g., a random access memory, a read only memory, or the like). The processor 702 and the memory 704 may be communicatively connected. In at least some embodiments, the computer 700 may include at least one processor and at least one memory including computer program code, wherein the at least one memory and the computer program code are configured to, with the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as a multicast source 101 or a portion thereof, a root BIER router 110 or a portion thereof, an element of BIER domain 115 or a portion thereof, a PH BIER router 120 or a portion thereof, an egress leaf router 130 or a portion thereof, a multicast receiver 199 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including program code;
   wherein the at least one memory and the program code are configured to, with the at least one processor, cause the apparatus to at least:
   receive, by an egress leaf router associated with a multicast domain from a penultimate hop router of the multicast domain, an indication of an identifier of the penultimate hop router in the multicast domain; and
   send, by the egress leaf router toward the penultimate hop router, multicast service signaling using the identifier of the penultimate hop router in the multicast domain as an identifier of the egress leaf router in the multicast domain.

2. The apparatus of claim 1, wherein the at least one memory and the program code are configured to, with the at least one processor, cause the apparatus to at least:
   send, by the egress leaf router toward the penultimate hop router, a request by the egress leaf router for the penultimate hop router to use penultimate hop popping.

3. The apparatus of claim 2, wherein the request by the egress leaf router for the penultimate hop router to use penultimate hop popping includes an advertisement of implicit null functionality by the egress leaf router.

4. The apparatus of claim 2, wherein the request by the egress leaf router for the penultimate hop router to use penultimate hop popping includes an invalid node identifier for the egress leaf router in the multicast domain.

5. The apparatus of claim 1, wherein the indication of the identifier of the penultimate hop router in the multicast domain is received in an advertisement of the penultimate hop router of the multicast domain.

6. The apparatus of claim 5, wherein the advertisement of the penultimate hop router is received in multicast domain signaling via a routing information protocol.

7. The apparatus of claim 1, wherein the multicast domain is a Bit Index Explicit Replication (BIER) domain, wherein the identifier of the penultimate hop router in the multicast domain includes a BIER Forwarding Router Identifier (BFR-ID) of the penultimate hop router of the multicast domain.

8. The apparatus of claim 1, wherein the multicast service signaling includes at least one of Multicast Virtual Private Network (MVPN) service signaling or Ethernet Virtual Private Network (EVPN) service signaling.

9. A method, comprising:
   receiving, by an egress leaf router associated with a multicast domain from a penultimate hop router of the multicast domain, an indication of an identifier of the penultimate hop router in the multicast domain; and
   sending, by the egress leaf router toward the penultimate hop router, multicast service signaling using the identifier of the penultimate hop router in the multicast domain as an identifier of the egress leaf router in the multicast domain.

10. An apparatus, comprising:
    at least one processor; and
    at least one memory including program code;
    wherein the at least one memory and the program code are configured to, with the at least one processor, cause the apparatus to at least:
    receive, by a penultimate hop router of a multicast domain from an egress leaf router associated with the multicast domain, an indication of a request by the egress leaf router for the penultimate hop router to use penultimate hop popping; and
    send, by the penultimate hop router toward the egress leaf router based on the indication of the request by the egress leaf router for the penultimate hop router to use penultimate hop popping, an advertisement including an identifier of the penultimate hop router in the multicast domain.

11. The apparatus of claim 10, wherein the indication of the request by the egress leaf router for the penultimate hop router to use penultimate hop popping includes an advertisement of implicit null functionality by the egress leaf router.

12. The apparatus of claim 10, wherein the indication of the request by the egress leaf router for the penultimate hop router to use penultimate hop popping includes an invalid node identifier for the egress leaf router in the multicast domain.

13. The apparatus of claim 10, wherein the indication of the request by the egress leaf router for the penultimate hop router to use penultimate hop popping is received in an advertisement of the egress leaf router, wherein the advertisement of the egress leaf router includes an information element including an invalid node identifier for the egress leaf router in the multicast domain.

14. The apparatus of claim 13, wherein, to send the advertisement including the identifier of the penultimate hop router in the multicast domain, the at least one memory and the program code are configured to, with the at least one processor, cause the apparatus to at least:
    modify, by the penultimate hop router, the advertisement of the egress leaf router to form a modified advertisement of the egress leaf router; and
    forward, by the penultimate hop router, the modified advertisement of the egress leaf router.

15. The apparatus of claim 14, wherein, to modify the advertisement of the egress leaf router to form the modified advertisement of the egress leaf router, the at least one memory and the program code are configured to, with the at least one processor, cause the apparatus to at least:
    replace, by the penultimate hop router within the information element, the invalid node identifier for the egress leaf router in the multicast domain with the identifier of the penultimate hop router in the multicast domain.

16. The apparatus of claim 14, wherein, to modify the advertisement of the egress leaf router to form the modified advertisement of the egress leaf router, the at least one memory and the program code are configured to, with the at least one processor, cause the apparatus to at least:
    remove, by the penultimate hop router, the information element from the advertisement of the egress leaf router.

17. The apparatus of claim 13, wherein, to send the advertisement including the identifier of the penultimate hop router in the multicast domain, the at least one memory and the program code are configured to, with the at least one processor, cause the apparatus to at least:
    forward, by the penultimate hop router, the advertisement of the egress leaf router.

18. The apparatus of claim 10, wherein the at least one memory and the program code are configured to, with the at least one processor, cause the apparatus to at least:

send, by the penultimate hop router within the multicast domain, the advertisement including the identifier of the penultimate hop router in the multicast domain.

19. The apparatus of claim 10, wherein the at least one memory and the program code are configured to, with the at least one processor, cause the apparatus to at least:

receive, by the penultimate hop router from the egress leaf router, multicast service signaling including the identifier of the penultimate hop router as an identifier of the egress leaf router in the multicast domain.

20. The apparatus of claim 10, wherein the at least one memory and the program code are configured to, with the at least one processor, cause the apparatus to at least:

receive, by the penultimate hop router via the multicast domain, a packet including a multicast packet, a multicast domain header, and a multicast domain label, wherein the multicast packet includes a multicast payload and an upstream assigned label associated with the egress leaf router;

remove, by the penultimate hop router from the packet to recover thereby the multicast packet, the multicast domain label and the multicast domain header; and forward, by the penultimate hop router toward the egress leaf router, the multicast packet.

21. The apparatus of claim 20, wherein, to forward the multicast packet, the at least one memory and the program code are configured to, with the at least one processor, cause the apparatus to at least:

send, by the penultimate hop router over each interface of the penultimate hop router on which the penultimate hop router received a route related to the multicast domain, the multicast packet.

22. The apparatus of claim 20, wherein, to forward the multicast packet, the at least one memory and the program code are configured to, with the at least one processor, cause the apparatus to at least:

determine, by the penultimate hop router based on a mapping of the upstream assigned label for the egress leaf router to a multicast domain prefix for the egress leaf router, an interface of the penultimate hop router that is connected to the egress leaf router; and send, by the penultimate hop router via the interface of the penultimate hop router that is connected to the egress leaf router, the multicast packet.

23. The apparatus of claim 10, wherein the multicast domain is a Bit Index Explicit Replication (BIER) domain, wherein the identifier of the penultimate hop router in the multicast domain includes a BIER Forwarding Router Identifier (BFR-ID) of the penultimate hop router of the multicast domain.

24. The apparatus of claim 19, wherein the multicast service signaling includes at least one of Multicast Virtual Private Network (MVPN) service signaling or Ethernet Virtual Private Network (EVPN) service signaling.

25. A method, comprising:

receiving, by a penultimate hop router of a multicast domain from an egress leaf router associated with the multicast domain, an indication of a request by the egress leaf router for the penultimate hop router to use penultimate hop popping; and sending, by the penultimate hop router toward the egress leaf router based on the indication of the request by the egress leaf router for the penultimate hop router to use penultimate hop popping, an advertisement including an identifier of the penultimate hop router in the multicast domain.

* * * * *